United States Patent [19]

Chaumont et al.

[11] 3,732,378

[45] May 8, 1973

[54] PROCESS AND APPARATUS FOR THE REGENERATION OF RECTANGULAR SIGNALS

[75] Inventors: Robert Jean Chaumont, Sceaux; Gilbert Louis Bargeton, Paris, both of France

[73] Assignee: Societe dite: Societe Anonyme de Telecommunications, Paris, France

[22] Filed: Mar. 17, 1971

[21] Appl. No.: 125,041

[52] U.S. Cl...........179/16 EA, 179/15 AD, 307/265, 307/268, 328/164, 329/101, 329/106

[51] Int. Cl...........................H04m 1/36, H041 27/06

[58] Field of Search.........................307/234, 237, 235, 307/261, 264, 268; 179/16 E, 16 EA, 15 AD; 325/13, 322, 323; 328/28, 31, 33, 111, 164; 329/101, 106

[56] References Cited

UNITED STATES PATENTS

| | | | |
|---|---|---|---|
| 3,290,518 | 12/1966 | Guisinger | 307/234 |
| 3,584,241 | 6/1971 | Nakamura | 307/235 R |
| 3,564,437 | 2/1971 | Nakashima | 307/237 |
| 3,558,917 | 1/1971 | Crouse | 307/235 R |
| 3,454,787 | 7/1969 | Gelernter | 307/235 R |
| 3,388,266 | 6/1968 | Kjar | 307/235 R |

*Primary Examiner*—Kathleen H. Claffy
*Assistant Examiner*—Randall P. Myers
*Attorney*—Seidel, Gonda & Goldhammer

[57] ABSTRACT

The present invention relates to a process and a transistorized device for improving the reproduction of the duration of successive signals of a train of impulses such as are utilized, for example, in automatic telephonic systems for the transmission of call signals on each of the channels of a carrier current multiplex signal in which the rectangular signals of a train of rectangular impulses are generated by modulating the amplitude of a sinusoidal wave, the frequency of which is high by comparison with the recurrence frequency of said impulses, and in which the duration of the regenerated impulses is determined by the time-interval between the passage of a threshold value by an impulse, on one hand, when that impulse passes from zero to maximum value and, on the other hand, when that impulse passes from its maximum value to zero, while according to the invention, the threshold value is varied in the same direction as the variations in its maximum value of this impulse during the time this impulse passes from maximum value to zero.

10 Claims, 3 Drawing Figures

PROCESS AND APPARATUS FOR THE REGENERATION OF RECTANGULAR SIGNALS

Figure 1:
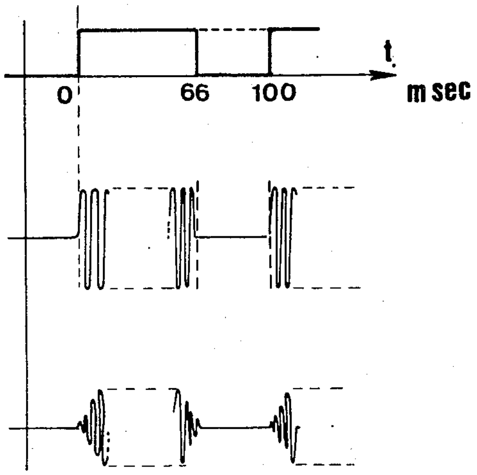

The present invention relates to a process and a transistorized device for improving the reproduction of the duration of the successive signals of a train of impulses such as are utilized, for example, in automatic telephone systems for the transmission of call signals on each of the channels of a carrier current multiplex system.

The assembly according to the invention thus becomes part of the receiving channel installation of a 12-channel terminal which has the task of enabling the transmitted impulses, initiated by a subscriber dialing, to be regenerated as well as possible in order to transmit them to the telephone exchange of the subscriber concerned.

It is known that at the transmitting terminal of a carrier current multiplex system, the call impulses on one channel, transmitted in the form of rectangular waves modulating the amplitude of a sinusoidal signal of which the frequency is within or outside the speech frequency band. The resultant signal follows all or part of the path of that of the speech signals on the same channel, then undergoes the same frequency transpositions and passes through the same intermediate filter devices as these. At the receiving terminal and for the demodulation stage which in principle regenerates said resultant signals, an alternating signal is thus obtained of which the envelope instead of being rectangular is trapezoidal, and of which the maximum amplitude can vary within quite large limits. The regeneration of the transmitted signals is effected by the detection of the envelope of this alternating signal, for example by means of a transistor which changes state when the amplitude of the envelope exceeds a certain threshold and which reverts to its original state falls below the threshold concerned.

The duration of the period during which the transistor actually changes state is the duration of the regeneration of the transmitted signals. But it depends, for a given threshold value, both on the level of the maximum value of the envelope, and thus on the level of the signals received, and on the sides of the envelope, which depends essentially on the effect of the filter devices in the total transmission chain.

The object of this invention is in particular to overcome these disadvantages. It relates therefore to a process for regenerating the rectangular signals of a train of rectangular impulses, modulating the amplitude of a sinusoidal wave of a frequency which is high compared with the recurrence frequency of said impulses, and in which the duration of the regenerated impulses is determined by the time-interval between the passage of a threshold value by an impulse, on the one hand when that impulse passes form zero to maximum value and, on the other hand, when that impulse passes from its maximum value to zero more particularly, it relates to a process in which during the passage of the impulse from a maximum value to zero the threshold value is varied in the same direction as the variations of the maximum value of this impulse.

The invention also relates to a device in which a first transistor of which the emitter circuit comprises a resistor in parallel across a capacitor, and of which the base is connected to the collector by means of resistor, connected also to a second transistor, which amplifies the signals received, and the collector circuit of the first transistor comprises the primary of a transformer supplying current to a rectifier circuit able to control the state, blocked or passing, of a third transistor connected by its emitter to said output terminal of the assembly.

The invention also relates to an installation, and in particular to a telephone installation, for the transmission of call signals on each of the channels of a multiplex system comprising the device in accordance with the foregoing, connected to the outlet of a transmission chain of rectangular impulses, modulating the amplitude of a sinusoidal wave of a frequency which is high compared with the recurrence frequency of said impulses.

The assembly according to the invention comprises in addition a first and second transistor, the first acting as a common amplifier of the input signals, the second, connected by its base to the collector of the first transistor, comprising the primary of said transformer in its circuit, said assembly according to the invention being characterized by a high value resistor connecting its collector and its base. It comprises a resistor of average value in parallel across a capacitor of high value in its emitter circuit, the value of the resistor being determined by the selection of an average operating current for the assembly and the value of capacitor in order to ensure that said capacitor retains a certain load voltage across its terminals at the end of each impulse and attains its original voltage at the beginning of the following impulse.

In an improved variant of an assembly according to the invention, a third transistor of the same type as the first and second transistors, is supplied with current flowing in a direction opposite to that in which it flows in the first and second transistors, comprises an adjustable resistor in its emitter circuit, and is connected to the terminals of the assembly by its emitter connected to its base and by one of the terminals of the load resistor of its collector circuit.

The invention will be better understood by reference to the accompanying drawings which show :

FIG. 1, the form of the impulse

Figure 2:
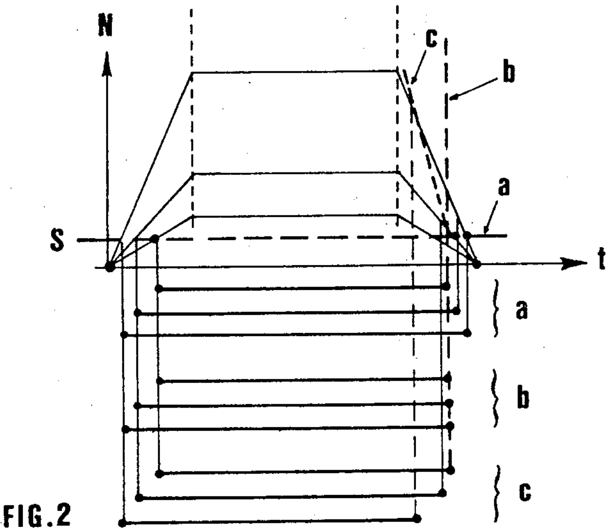

FIG. 2 , the envelope of signals received

Figure 3:
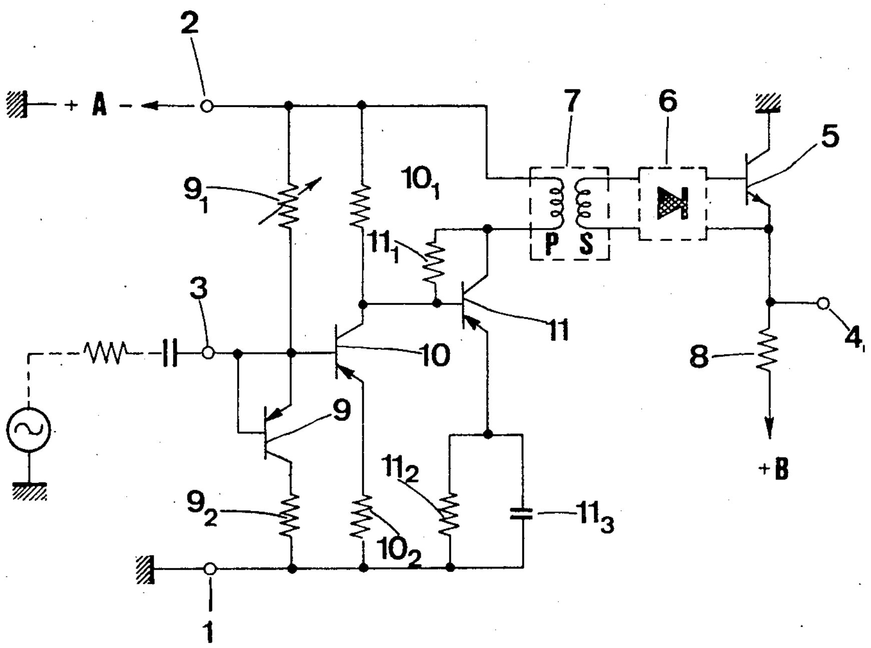

FIG. 3 , the diagram of the assembly principle according to the invention.

The object of the assembly according to the invention is therefore to regenerate the call signals of virtually constant duration, in spite of the trapezoidal deformation of the envelope of the signals received and within the wide limits of variations of their amplitude level. The process used in this invention consists of making the two state transition thresholds of a transistor different.

FIG. 1 shows in succession, from top to bottom :

the form of the train of call impulses, for example in the extreme case where the amplitude has a non-zero value during 66ms over a repetition period of 100 ms.

the form of a transmission signal resulting from the amplitude modulation of a sinusoidal wave by the impulses generated by a call, the frequency of said wave in practice being a few kHz.

the form of the signal received, after frequency transpositions, filter ing and successive demodulations over the entire transmission chain of the resultant signal.

It can be taken as a good approximation, that the positive envelope of the signals received has a form such as is shown in FIG. 2 for three levels, namely for :

a low level a nominal level, double the preceeding level;

a high level, double the nominal level.

If the duration of the regeneration of a signal (see FIG. 2) is taken as the time interval between, on one hand, the passage of a positive envelope from an amplitude zero to an amplitude greater than the threshold value S, and on the other, the passage of a positive envelope of a maximum amplitude to an amplitude equal to or less than that value, it is observed that, for the three levels shown in that figure, there are divergences in the duration of the regeneration as indicated by the horizontal lines indicated at *a* in FIG. 2.

These divergences would be reduced by half as indicated at *b*, if the duration of the regeneration were the time interval between the passage of the positive envelope of a value above that of the threshold valve S, and the passage of the envelope of a value below that of the different values of given thresholds, specific to each signal, and proportional to the amplitude of these latter.

Finally, and this is the object of the invention, these divergences are still more reduced and in fact become practically zero if, with the threshold level S remaining unchanged so far as the front part of the envelope is concerned, the threshold level specific to each level are distributed as shown by the curve *c* in FIG. 2 for the back part of the envelope, this curve representing approximately a branch of a hyperbola, that is the threshold level, for the back part of each signal, varies in the direction as the amplitude of said signal.

For better understanding, reference should be made to FIG. 3 which shows a diagram of the assembly principle according to this invention.

The assembly comprises terminals 1 and 2 for connection to the ground and to the negative pole, for example, of a battery A of which the positive pole is connected to the ground. The signals received, represented here by an equivalent generator followed by a blocking capacitor, reach the assembly by the asymmetrical input terminals 1 and 3. The potential found at the output terminal 4 is either that of the B-battery or ground. The batteries A and B the ground connected to the terminal 1 are of different nature in accordance with current practice.

The value of the actual potential of the terminal 4 depends on the state of the transistor 5 controlled by the output voltage of the detector 6, itself being activated by the transformer 7.

As an example, transistors of the type PNP were used in this device.

In regard to the transistor 9, the short circuit between its emitter and its base reduces its function to that of the equivalent base-collector diode polarized by the voltage A by means of the set of resistors $9_1$ and $9_2$, the former being adjustable.

In regard to the transistor 10, arranged in a common emitter configuration, its role is is that of a voltage amplifier according to the relation between the resistors $10_1$ and $10_2$. However, its mean operating point can be adjusted over a range of possible values by regulating the resistor $9_1$.

In regard to the transistor 11 of which the base is connected to the collector of the transistor 10, it comprises the primary of the transformer 7 in the collector circuit, and the resistor $11_2$ and the capacitor $11_3$ in parallel in its emitter circuit. The value of the resistor $11_2$ enables the emitter current of 11 to be adjusted, taking the values of the resistors $10_1$ and $10_2$ into consideration as well as the setting selected for the value of $9_1$.

In a practical application of the assembly, the resistors $10_1$ and $11_2$ have a medium value, the resistor $10_2$ a low value, and the resistors $9_1$ and $11_1$ a high value. As an example of the steady state voltages, the steady state voltage at terminal 2 may be minus 22.5 volts, at terminal 3 the voltage may be minus 1.4 volts and the voltage may be 4.5 volts across the terminals of resistor $11_2$volts and 4.5 volts at the terminals $11_2$.

The role of the transistor 9 in the operation of the device is to stabilize the properties of the assembly in relation to the variation of the ambient temperature.

When the resultant signal is applied to the terminals 1—3, it is amplified by the transistor 10 which acts as a linear amplifier within the working limits.

On the other hand, the transistor 11 does not linearly amplify the alternating components of the signal received at its base unless they are of low amplitude.

If their amplitude is sufficiently high several effects are produced:

the base of 11 can become more positive if the emitter of transistor 11 is blocked in response to positive half-waves of the signal received;

the transistor outputs in response to a negative half-waves of the signal received.

These two operations lead to a detection by the base-emitter diode of the transistor 11, followed by a current amplification by the same transistor, which has the effect of producing a continuous current at the terminals of the capacitor $11_3$ making the emitter of the transistor 11 more negative. Only the negative peaks of the signal received are then amplified.

Since the load impedance of the transformer 7 has linear characteristics, the alternating current produced at the collector of the transistor 11 remains virtually unchanged. As a result, a counter-reaction is set up the value of which is inversely proportional to the level of the signal received. This action reinforces the phenomenon described above and tends to increase the charge on the capacitor $11_3$ for high levels.

For a signal received of which the maximum value of the envelope, such as is shown in FIG. 2, exceeds the threshold values S to an amount which can be equivalent, for example, to twice that of S, the device operation as a linear amplifier and the capacitor $11_3$ retains its initial charge. The result is that the threshold remains virtually the same for both sides of the trapezoidal envelope of the signal received.

For a signal received of which the maximum amplitude is equivalent, for example, to 4 times that of the S in FIG. 2, which, in many applications correspond with advantage to the nominal value, the non-linear phenomenon previously described result in the capacitor $11_3$ being charged and render the polarization of the emitter of the transistor 11 more negative.

It is taken that the capacitor $11_3$, during the period the side of the envelope is descending, retains the charge it acquired during the period when the envelope had its maximum value; when the amplitude of the signal begins to decrease, the transistor 11 becomes blocked, which results in the return of he transistor 5 to its previous state at the moment the signal was received.

This blockage occurs when the current resulting from the superposition of the continuous polarization voltage and the alternating voltage of the signal amplified by the transistor 10 is equal the base-emitter voltage apart, to the continuous voltage at that moment at the emitter of the transistor 11.

By judiciously selecting the various components of the assembly, it is possible to regulate the time which passes before the appearance of the descending side of the envelope and the blockage of the transistor.

On the other hand, the values of the resistor $11_2$ and the capacitor $11_3$ are selected in a way such that on the arrival of a signal, the capacitor $11_3$ has the same voltage across its terminals as in the absence of a signal; the threshold values for the ascending side of the envelope of the signal is the same as that in the case of linear amplification.

For applications which require a correction extending to plus or minus 6 decibels of the nominal value of the signal, what happens is identical to that which was previously described for signals of which the maximum amplitude is equal to twice the nominal value.

It can be taken that, in the absence of the resistor $11_1$, the polarization of the emitter of the transistor 11 varies virtually proportionally to the level of the envelope of the signal received. This is illustrated in the case b in FIG. 2. But the additional effect of the resistor $11_1$ leads to the situation represented in the case c in the same FIG. 2.

It was observed in a practical application that the regeneration of the duration of the signals received did not vary by more than 1 millisecond for variations of 6 decibels of the signal level around or on either side of the selected nominal level. In addition, the transistor 9 was found to be efficient at ambient temperatures varying from −40° to +60° C.

The additional charge acquired by the capacitor $11_3$ during the period the signal is received when the maximum values attained must be discharged during the period when the amplitude of the signal received is zero.

Let ΔV be the increase in the voltage V at the terminals $11_3$, C the value of the capacitor $11_3$ and R the value of the resistor $11_2$. During the time $t_o$ during which the amplitude of the signal received is zero, the discharge of $11_3$ taken place exponentially in accordance with :

$$V = (V + V)\, e^{-t_0/CR}$$

whence :

$$CR = \text{to}/\text{Log}\,(1 - \Delta V/V)$$

This relationship is used to determine $C$, $R$ and $V$ being known, in a case where $V$ corresponds to the nominal level of the signals received. In practice, the value of $C$ attains several microfarads.

The figures of the orders of magnitude given previously apply to the example chosen for an assembly for regenerating as well as possible and improving the duration of successive signals of a train of impulses of call signals.

The scope of the invention, however, is not limited to the example chosen and applies , with components of different characteristics, to all cases where signals of a train of impulses modulate the amplitude of a sinusoidal wave.

We claim:

1. A process for regenerating rectangular signals from an amplitude modulated sinusoidal wave, said amplitude modulated sinusoidal wave having been modulated by a rectangular signal, comprising the steps of:
   generating a signal output in response to detecting the magnitude of said amplitude modulated sinusoidal wave exceeding a threshold value;
   adjusting said threshold value in response to the maximum magnitude of said amplitude modulated sinusoidal wave during said rectangular signal, said threshold value being varied in the same direction as the maximum magnitude of said amplitude modulated sinusoidal wave during said rectangular signal; and
   terminating said signal output in response to detecting the magnitude of said amplitude modulated sinusoidal wave decreasing below said adjusted threshold value in order to regenerate the signal having a duration substantially equal to said rectangular signal.

2. Apparatus for regenerating a signal from an amplitude modulated sinusoidal wave having a duration substantially equal to a rectangular signal used in modulating the amplitude modulated sinusoidal wave, comprising:
   a first transistor circuit, said first transistor circuit including a transistor having a base, collector and emitter, said base of said transistor receiving the amplitude modulated sinusoidal wave, said base being connected to said collector through a resistor and said emitter of said transistor being provided with a resistor connected in parallel with a capacitor, said capacitor being charged during a rectangular signal of the amplitude modulated sinusoidal wave and at least partially discharging through said resistor between rectangular signals;
   means for rectifying the signal developed on the collector of said transistor of said first transistor circuit; and
   switching means responsive to a rectified signal output of said rectifying means for producing said regenerated signal.

3. Apparatus in accordance with claim 2 including means for amplifying the amplitude modulated sinusoidal wave before applying it to said base of said transistor of said first transistor circuit.

4. Apparatus in accordance with claim 3 wherein said amplifying means comprises a transistor having a base, emitter and collector, said emitter and collector circuits being provided with resistors and said collector being connected to said base circuit of said transistor in said first transistor circuit.

5. Apparatus in accordance with claim 2 wherein said resistor in the base-collector circuit of said transistor in said first transistor circuit is substantially larger than the resistor in said emitter circuit of said transistor of said first transistor circuit.

6. Apparatus in accordance with claim 2 wherein the value of said capacitor in said emitter circuit of said transistor in said first transistor circuit is selected so that the voltage across its terminals at the beginning of each rectangular signal of the amplitude modulated sinusoidal wave is equal to that in the absence of a signal.

7. Apparatus in accordance with claim 2 wherein said rectifying means includes a transformer, said transformer being connected between the collector of said transistor of said first transistor and a rectifying element, said switching means being responsive to the output of the rectifying element.

8. Apparatus in accordance with claim 2 wherein said switching means responsive to the output of said rectifying means comprises a transistor.

9. Apparatus in accordance with claim 2 wherein said amplitude modulated sinusoidal wave is a call signal of a channel of a telephone multiplex system.

10. Apparatus in accordance with claim 9 wherein the frequency of the sinusoidal wave of the amplitude modulated sinusoidal wave is large with respect to the recurrence frequency of rectangular waves of said amplitude modulated sinusoidal wave.

* * * * *